United States Patent
Parisel et al.

(10) Patent No.: US 8,017,702 B2
(45) Date of Patent: Sep. 13, 2011

(54) POLYMERISATION PROCESS

(75) Inventors: Marc J. G. Parisel, Vilvoorde (BE); Brent R. Walworth, Sint-Niklaas (BE)

(73) Assignee: Ineos Manufacturing Belgium NV, Antwerpen (BE)

( * ) Notice: Subject to any disclaimer, the term of this patent is extended or adjusted under 35 U.S.C. 154(b) by 0 days.

(21) Appl. No.: 12/451,363

(22) PCT Filed: May 13, 2008

(86) PCT No.: PCT/EP2008/055815
§ 371 (c)(1), (2), (4) Date: Nov. 9, 2009

(87) PCT Pub. No.: WO2008/141968
PCT Pub. Date: Nov. 27, 2008

(65) Prior Publication Data
US 2010/0121002 A1 May 13, 2010

(30) Foreign Application Priority Data
May 18, 2007 (EP) ..................................... 07252062

(51) Int. Cl.
*C08F 2/00* (2006.01)
*C08F 6/00* (2006.01)
(52) U.S. Cl. .......................... 526/67; 526/68; 528/502 D
(58) Field of Classification Search .................... 526/64, 526/67, 68, 70; 585/315
See application file for complete search history.

(56) References Cited

U.S. PATENT DOCUMENTS

| | | | | |
|---|---|---|---|---|
| 3,816,383 | A * | 6/1974 | Stotko | 526/67 |
| 6,420,497 | B1 * | 7/2002 | Kufeld et al. | 526/64 |
| 6,489,409 | B2 * | 12/2002 | Marissal et al. | 526/70 |
| 2001/0018499 | A1 | 8/2001 | Marissal et al. | |

OTHER PUBLICATIONS

PCT International Preliminary Report on Patentability; International Application No. PCT/EP2008/055815; International filing date May 13, 2008 (7 pgs).

* cited by examiner

*Primary Examiner* — David W Wu
*Assistant Examiner* — Elizabeth Eng
(74) *Attorney, Agent, or Firm* — Nixon & Vanderhye

(57) ABSTRACT

Olefin polymerisation process in which a slurry of olefin polymer is produced within a polymerisation zone, followed by withdrawing a polymer slurry stream from the polymerisation zone, and passing the polymer slurry stream through a transfer line to a centrifugal concentrating device which separates the polymer slurry stream into a solids-lean stream or streams each having a solids concentration less than that of the polymer slurry stream entering the concentrating device and a solids-rich stream or streams each having a solids concentration greater than that of the polymer slurry stream entering the concentrating device. At least part of the solids-rich stream or streams is recycled back into the polymer slurry stream upstream of the concentrating device and downstream of the polymerisation zone, and 2-60 vol % of the solids-rich slurry stream is recycled back into the polymer slurry stream upstream of the concentrating device.

14 Claims, 1 Drawing Sheet

POLYMERISATION PROCESS

Figure 1:
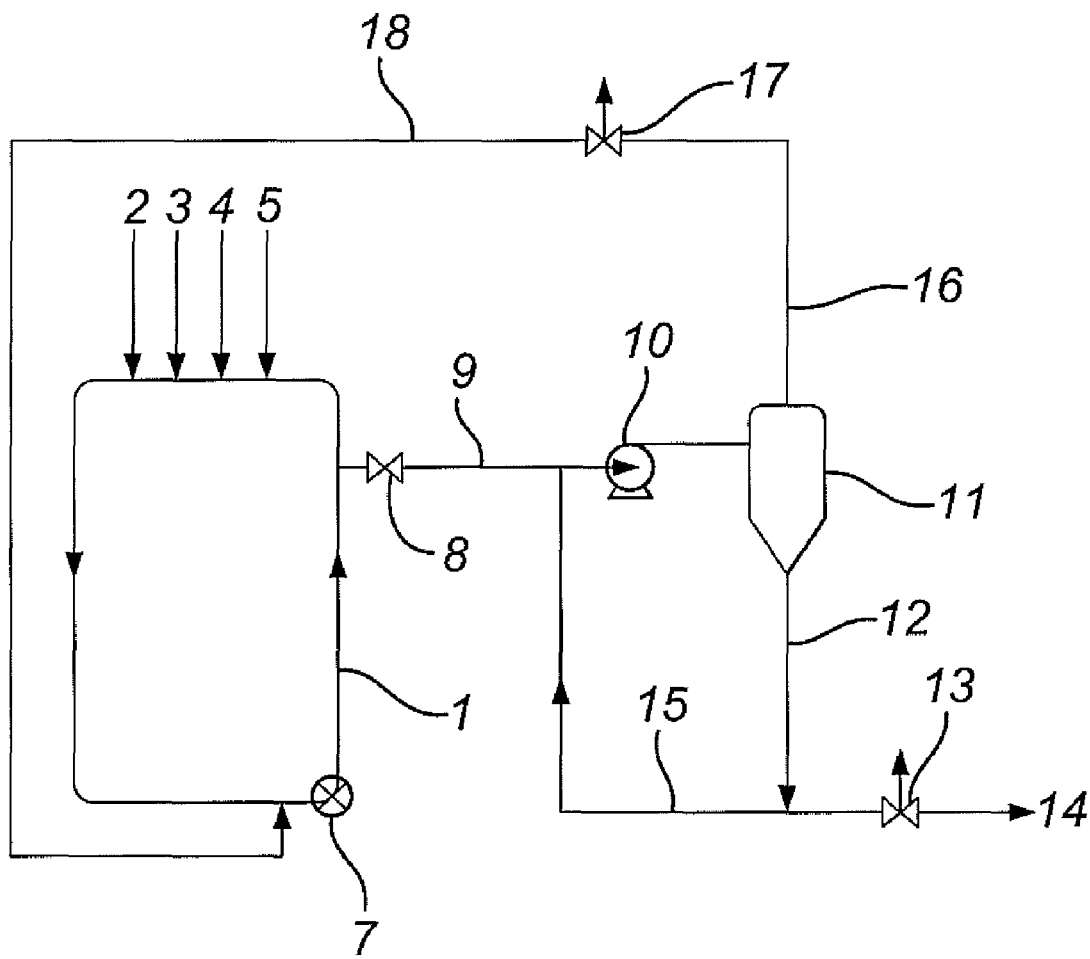

This application is the U.S. national phase of International Application No. PCT/EP2008/055815 filed 13 May 2008 which designated the U.S. and claims priority to European Patent Application No. 07252062.0 filed 18 May 2007, the entire contents of each of which are hereby incorporated by reference.

The present invention is concerned with an improved process and apparatus for slurry phase olefin polymerisations.

BACKGROUND OF THE INVENTION

Slurry phase polymerisation of olefins is well known wherein an olefin monomer, and optionally olefin comonomer, are polymerised in the presence of a catalyst in a diluent in which the solid polymer product is suspended and transported.

This invention is particularly related to polymerisation in a loop reactor where the slurry is circulated in the reactor typically by means of a pump or agitator. Liquid full loop reactors are well known in the art and are described for example in U.S. Pat. Nos. 3,152,872, 3,242,150 and 4,613,484. Polymerisation is typically carried out at temperatures in the range 50-125° C. and at pressures in the range 1-100 bara. The catalyst used can be any catalyst typically used for olefin polymerisation such as chromium oxide, Ziegler-Natta, metallocene or late transition metal-type catalysts. In slurry phase olefin polymerisation processes, the product is withdrawn from the polymerisation reactor in the form of a slurry of solid olefin polymer product suspended in a diluent. The diluent may be inert or reactive, liquid or supercritical. The product slurry comprising polymer and diluent, and in most cases catalyst, olefin monomer and comonomer, can be discharged intermittently or continuously.

In many polymerisation processes, concentrating devices such as hydrocyclones or settling legs are used to minimise the quantity of fluids withdrawn with the polymer for downstream reaction or processing. Such devices separate the polymer-containing stream into a solids-rich stream and a solids-lean stream. However whilst centrifugal concentrating devices are well known, the design of such devices itself is typically such that the operation can only be optimised over a limited range of design operating conditions. This is particularly the case for fixed concentrating devices which contain no rotating parts (the speed of which can be varied based on throughput). When operating away from such design operating conditions, particularly during start-up or grade transitions, not only is the efficiency of the solids concentration and particle size separation compromised but also the concentrating device and its associated pipework become much more susceptible to blockage, mainly due to polymerisation of active polymer present in the stream being concentrated. It is known in U.S. Pat. No. 3,816,383 to recycle part of the solids-rich stream produced by a concentrating device directly back into the polymerisation zone; however this process does not provide a means of varying the solids concentration of the feed to the concentrator independently of the solids concentration in the off-take stream from the polymerisation zone. In particular it cannot provide the concentrator with a feed stream that is more concentrated in solids than in the stream withdrawn from the polymerisation zone.

EP 1118626A discloses a process in which the solids-lean stream produced by a concentrating device is recycled directly back into the polymerisation zone. As above, this does not permit any control of the concentration of the feed entering the concentrator itself.

SUMMARY OF THE INVENTION

We have found a process for increasing the solids concentration of polymer-containing streams which are concentrated using a centrifugal concentrating device. More particularly, the present invention provides a means for controlling the concentration of polymer slurry fed to, or withdrawn from, a centrifugal concentrating device. Hereinbelow the term "concentrator" specifically means a centrifugal concentrating device. Accordingly in a first aspect the present invention provides an olefin polymerisation process in which a slurry of olefin polymer is produced within a polymerisation zone, and a polymer slurry stream is withdrawn from the polymerisation zone and passed through a transfer line to a centrifugal concentrating device, which separates it into a solids-lean stream or streams each having a solids concentration less than that of the polymer slurry stream entering the concentrating device and a solids-rich stream or streams each having a solids concentration greater than that of the polymer slurry stream entering the concentrating device, wherein at least part of the solids-rich stream or streams is recycled back into the polymer slurry stream upstream of the concentrating device and downstream of the polymerisation zone.

By "polymerisation zone" is meant a location where polymerisation takes place, which is normally a polymerisation reactor, and in this specification the terms "zone" and "reactor" are used interchangeably.

The provision of a recycle capability to the feed of the concentrator downstream of the polymerisation zone enables the volumetric flowrate and/or solids loading of the polymer slurry fed to or from the concentrator to be maintained within a much narrower range than would otherwise be possible over the typical range of plant operating conditions. Thus the invention provides a way of allowing a concentrator to operate within its optimum operating window whilst receiving polymer slurry which has been withdrawn from a polymerisation reactor over a much wider range of flowrates and slurry concentrations.

For example this invention provides a means to maintain a constant solids concentration in a stream fed to a concentrator or withdrawn from a concentrator (either in the solids rich stream or the solids lean stream) when either the flow-rate or the solids concentration of the polymer slurry withdrawn from the polymerisation zone is not constant. The flow rates of, and solids concentrations in, the concentrator feed stream or the concentrator discharge streams may be determined for control purposes, preferably on-line control, using mass-balance and/or density meters or other well known means.

The invention is particularly suited to slurry phase ethylene polymerisation processes, most particularly, in continuous loop reactors.

Polyethylene slurry polymerisation processes typically withdraw polymer from the polymerisation reactor with significant quantities of liquid hydrocarbons, and the present invention is therefore particularly relevant to such processes. The slurry in such reactors typically comprises the particulate polymer, the hydrocarbon diluent(s), (co)monomer(s), catalyst, chain terminators such as hydrogen and other reactor additives. In particular the slurry will comprise 20-75, preferably 30-70 weight percent based on the total weight of the slurry of particulate polymer and 80-25, preferably 70-30 weight percent based on the total weight of the slurry of suspending medium, where the suspending medium is the sum of all the fluid components in the reactor and comprises the diluent, olefin monomer and any additives; the diluent can be an inert diluent or it can be a reactive diluent such as a liquid olefin monomer. Where the principal diluent is an inert diluent the olefin monomer typically comprises 1-20 wt %, more particularly 2-10 wt % of the slurry.

The solids concentration in the slurry in an ethylene polymerisation reactor is typically above 20 vol %, preferably about 30 vol %, for example 25-35 volume % where volume % is [(total volume of the slurry−volume of the suspending medium)/(total volume of the slurry)]×100. The correlation of solids wt % to solids vol % will vary according to the polymer produced but more particularly according to the diluent used. Where the polymer produced is polyethylene and the diluent is an alkane, for example isobutane, it is preferred that the solids concentration within the polymerisation reactor is above 30 wt % in particular above 40 wt %, for example in the range 40-60 wt % preferably 45-55 wt % based on the total weight of the slurry.

It is preferred that not all of the solids-rich slurry stream removed from the concentrator is recycled; a portion of the stream is usually separated to be sent for further processing such as polymer recovery. Furthermore, whilst the present invention is directed to the recycle of a solids-rich slurry stream back into the feed line to the concentrator, it does not exclude the possibility that additionally another solids-rich stream, or one or more solids-lean streams, is recycled back to the polymerisation reactor.

The flowrate of the solids-rich recycle stream to the slurry stream upstream of the concentrator can vary as required such that it constitutes up to 99 vol %, preferably between 10 and 80 vol %, and in particular between 20 and 50 vol % of the concentrator feed stream. It is preferred that the proportion of the concentrator feed stream provided by the solids-rich recycle stream is varied such that the concentrator feedstream itself varies by no more than 20% from the average (where % is of the average), most preferably no more than 10% from the average over any one hour period.

Preferably 2-60 vol %, most preferably 10-30 vol % of the solids-rich slurry stream is recycled to the concentrator slurry feed stream downstream of the polymerisation zone, with the remainder being diverted for further processing such as polymer recovery.

The polymer slurry may be withdrawn from the polymerisation zone at any location. The withdrawal may be arranged such that the withdrawn polymer slurry has the same, or a greater or lesser, concentration as the average solids concentration within the polymerisation zone.

In order to minimize the heat input required in the downstream processing sections it is most preferred that the solids-rich stream withdrawn from the concentrator is maintained at as great a concentration as possible whilst still maintaining a reliable flow. A solids concentration of greater than 65 wt % is most preferred. The present invention enables the concentration of the solids-rich stream withdrawn from the concentrator to equal or exceed the concentration achieved with a settling leg.

The solids concentration of the solids-rich stream withdrawn from the concentrator is preferably at least 5 wt %, most preferably 10-20 wt %, greater than the average concentration in the polymerisation reactor. The invention enables solids-rich streams to be withdrawn from the concentrator which have a solids concentrations of 45 up to 65 wt % even when the polymerisation reactor is operating with relatively low average solids concentrations such as 30-40 wt %.

The flowrate of the solids-rich stream withdrawn from the concentrator can be controlled to maintain the difference between the average solids concentration in the feed to the concentrator and the average solids concentration within the polymerisation reactor at 30-70 wt %, preferably 40-60 wt % of the difference between the average solids concentration within the reactor and the average solids concentration in the solids-rich stream withdrawn from the concentrator.

Any or all of the polymerisation reactor withdrawal stream and the solids-rich or the solids-lean streams withdrawn from the concentrator may be provided with cooling, which is preferably indirect and most preferably external. This permits control of the temperature of the slurry feed stream into the concentrator.

Any stream recycled from the concentrator can either be isolated or diverted back to the polymerisation reactor should a blockage be detected in the concentrator or a feed or withdrawal stream (eg by absolute or differential flow or pressure measurement). A standby concentrator feed or withdrawal line may be commissioned should a blockage be detected in that line.

Concentrators may optionally be operated in parallel, with or without an offline standby concentrator. In configurations with parallel concentrators it is within the scope of this invention that a polymer rich stream from one concentrator is recycled to the feed of a parallel concentrator.

Whilst the polymer slurry withdrawal from the polymerisation zone is preferably from a region having higher pressure than the pressure of any streams returned to the polymerisation zone from the concentrator, it is preferred that a pump is employed to improve the efficiency and reliability of the separation in the concentrator. The recycle stream or streams may be driven by one or more pumps, preferably located in the polymer slurry feed stream for the concentrator downstream of the introduction point of the recycle stream. The pump is preferably a single centrifugal type pump.

The present invention may be used in systems that operate either continuous or discontinuous withdrawal of slurry from the polymerisation zone. Operation of hydrocyclones can be particularly unreliable and inefficient when operating with an intermittent or highly variable feed flow, such as is the case when withdrawing the polymer slurry from the polymerisation reactor discontinuously, and this invention may provide significant benefits for such an arrangement. When operating in this mode, the present invention permits the flowrate of the solids-rich stream recycled from the concentrator to be controlled or varied in order to minimise fluctuations in the feed flowrate to the concentrator.

The invention is suitable for use in processes for the polymerisation of any suitable alpha-olefins using known low pressure polymerisation techniques carried out in the presence of chromium oxide, organometallic, metallocene or other catalyst systems. The invention is particularly useful in the production of ethylene polymers using organometallic or chromium oxide catalysts.

A preferred type of reactor utilised for such polymerisations is a loop reactor, which is a continuous tubular construction comprising at least two, for example four, vertical sections and at least two, for example four horizontal sections. The heat of polymerisation is typically removed using indirect exchange with a cooling medium, preferably water, in jackets surrounding at least part of the tubular loop reactor. The volume of one loop reactor in a multiple reactor system can vary but is typically in the range 10-200 m$^3$.

The pressure employed in such a loop reactor is sufficient to maintain the reaction system 'liquid full' i.e the diluent and reagents (i.e. monomers and chain terminators) substantially in a liquid phase, normally pressures used are between 1-100 bara, preferably between 30 to 50 bara. In ethylene polymerisation the ethylene partial pressure is most often chosen from 0.1 to 5 MPa, preferably from 0.2 to 2 MPa, more particularly from 0.4 to 1.5 MPa. The temperatures selected are such that substantially all of the polymer produced is essentially (i) in non-tacky and non-agglomerative solid particle and (ii) insoluble in the diluent. The polymerisation temperature depends on the hydrocarbon diluent chosen and the polymer being produced. In ethylene polymerisation it is generally below 130° C., typically between 50 and 125° C., preferably between 75 and 115° C. For example in ethylene polymerisation in isobutane diluent, the pressure employed in the loop is preferably in the range 30-50 bara, the ethylene partial pressure is preferably in the range 0.2-2 MPa and the polymerisation temperature is in the range 75-115° C.

The process according to the invention applies to the preparation of compositions containing olefin (preferably ethylene) polymers which can comprise one or a number of olefin homo-polymers and/or one or a number of copolymers. The process according to the invention is particularly suited to the manufacture of ethylene and propylene polymers. Ethylene copolymers typically comprise an alpha-olefin in a variable amount which can reach 12% by weight, preferably from 0.5 to 6% by weight, for example approximately 1% by weight.

The alpha mono-olefin monomers generally employed in such reactions are one or more 1-olefins having up to 8 carbon atoms per molecule and no branching nearer the double bond than the 4-position. Typical examples include ethylene, propylene, butene-1, pentene-1, and octene-1, and mixtures such as ethylene and butene-1 or ethylene and hexene-1. Butene-1, pentene-1 and hexene-1 are particularly preferred comonomers for ethylene copolymerisation.

Typical diluents employed in such alpha-monoolefin polymerisations include hydrocarbons having 3 to 12, preferably 3 to 8, carbon atoms per molecule, such as linear alkanes such as propane, n-butane, n-hexane and n-heptane, or branched alkanes such as isobutane, isopentane, toluene, isooctane and 2,2,-dimethylpropane, or cycloalkanes such as cyclopentane and cyclohexane or their mixtures. In the case of ethylene polymerisation, the diluent is generally inert with respect to the catalyst, cocatalyst and polymer produced (such as liquid aliphatic, cycloaliphatic and aromatic hydrocarbons), at a temperature such that at least 50% (preferably at least 70%) of the polymer formed is insoluble therein. Isobutane is particularly preferred as the suspending medium for ethylene polymerisation The operating conditions can also be such that the monomers (eg ethylene, propylene) act as the principal suspending medium or diluent as is the case in so called bulk polymerisation processes. The slurry concentration limits in volume percent have been found to be able to be applied independently of molecular weight of suspension medium and whether the suspension medium is inert or reactive, liquid or supercritical. Propylene monomer is particularly preferred as the diluent for propylene polymerisation.

Methods of molecular weight regulation are known in the art and need not be described in detail. When using Ziegler-Natta, metallocene and tridentate late transition metal type catalysts, hydrogen is preferably used, a higher hydrogen pressure resulting in a lower average molecular weight. When using chromium type catalysts, polymerisation temperature is preferably used to regulate molecular weight.

BRIEF DESCRIPTION OF THE DRAWINGS AND DETAILED DESCRIPTION

The invention is illustrated with respect to FIG. 1. FIG. 1 shows a loop reactor 1 into which an olefin monomer stream 2, a fresh diluent stream 3, a recycle diluent stream 4 and a catalyst stream 5, are introduced into the loop reactor 1. The catalyst is suitably introduced as a suspension in the diluent. This invention is applicable to loop reactors of any size and any production rate; however it is most relevant to large reactor loop volumes (60-200 cubic meters). Streams 2, 3, 4 and 5 may be introduced together or separately, each at one or more locations anywhere in the loop reactor circuit. Alternatively or additionally streams 2-5 may be introduced into the solids lean recycle stream 18 to the loop reactor. The reaction mixture is continuously circulated in the direction designated by arrows 6, by an impeller 7 at a velocity sufficient to maintain the polymer solids suspended by, and well distributed in, the diluent.

In accordance with the invention the polymer slurry is removed from the loop reactor 1, preferably continuously, through a valve 8 into line 9 and through a centrifugal pump 10 to a hydrocyclone concentrator 11. There may be more than one reactor polymer withdrawal line, and each line may have its own dedicated hydrocyclone circuit. However it is preferred that a single hydrocyclone circuit is used to concentrate all withdrawal streams. The flow to the concentrator 11 may be further controlled by varying the speed of pump 10, or the pump discharge may also optionally be restricted using for example a control valve (not shown).

The concentrator 11 acts principally as a solids separator, a greater proportion of the solid polymer particles being separated as a solids-rich stream 12 and the liquid diluent together with any residual monomer or other fluids and fines separating as a solids-lean stream 16, 18. The solids-rich stream typically tends to have a greater concentration of larger particles than the solids-lean stream.

The solids-rich stream is removed as stream 12, a portion of which is taken off through valve 13 into line 14 for downstream reaction or recovery and a residual portion of which is fed through line 15 for recycle to the suction of pump 10. It is this recycle line 15 which, as discussed above, can be operated so as to ensure that a constant volumetric flow and/or solids concentration through the hydrocyclone concentrator 11 is maintained. The solids lean overflow stream, on the other hand, is removed from the separator through line 16 and recycled to reactor 1 through valve 17 and line 18.

The product slurry removed through line 14 is enriched in the desired solid polymer product. For example, polymer, preferably polyethylene, containing slurries with solids concentrations of from about 40 to 75 percent by weight may be thus separated and removed for subsequent drying and recovery. This invention decreases subsequent after-treatment while simultaneously effecting at least a partial classification of the desired polymer and reduction in reactor 1 reagents fed to downstream reactors or recovery processes. A diluent make-up capability is preferably added to stream 15 to assist in stream flowability but also to reduce the reagent concentration in stream 14 (in accordance with our separate invention).

The concentrator is preferably located such that the length of lines transferring the solids rich streams are kept to a minimum, preferably less than 5 m, most preferably less than 1 m. The solids rich stream is also ideally vertical or as close to vertical as possible for as much of the transfer length as possible. The pump is preferably located at a lower elevation than the concentrator. The velocity in the slurry transfer lines needs to be maintained above the sedimentation velocity and where the solids concentration is below 50 wt % is usually maintained between 1 and 15 m/s, preferably between 1.5 and 9 m/s. The velocity in the slurry transfer lines where the solids concentration is between 55 and 65 wt % is usually maintained between 3 and 20 m/s, preferably between 4 and 10 m/s. The velocity in the slurry transfer lines where the solids concentration is between 65 and 75 wt % is usually between 3 and 20 m/s, preferably between 3.5 and 12 m/s, most preferably between 4 and 15 m/s.

The polymer slurry take-off line 9 and the recycle line 18 are preferably connected to loop reactor 1 downstream and upstream, respectively, of the impeller 7 for the reaction mixture. The pressure drop across this pump provides a pressure gradient that reduces the duty of pump 10. The pressure differential across impeller 7 is typically 5 to 25 meters of head and across pump 10 is typically 20 to 150 meters of head. The pressure differential between the concentrator feed and polymer rich or polymer lean outlets is typically 10 to 40 meters of head, most preferably 20 to 30 meters of head.

EXAMPLES

Example 1

This example is an arrangement as shown in FIG. 1, in which a polymer-containing slurry is discharged from a reactor 1 into a hydrocyclone 11 via line 9. The solids-lean stream from the hydrocyclone is recycled to the reactor via line 16, whilst the solids-rich stream from the hydrocyclone is separated into two flows, one of which passes downstream via line 14, and the other of which is recycled into line 9 via line 15.

The production rate of the reactor is 10000 kg/h, and it has a solids concentration of 41 wt %. The conditions in the lines shown in FIG. 1 are given in Table 1 below.

TABLE 1

| | | Line 9 before recycle | Line 12 | Line 14 | Line 15 | Line 16 | Line 9 after recycle |
|---|---|---|---|---|---|---|---|
| Total slurry flow | kg/h | 33000 | 34580 | 18690 | 15890 | 14310 | 48889 |
| Liquid flow | kg/h | 19470 | 16080 | 8690 | 7390 | 10780 | 26859 |
| Solid flow | kg/h | 13530 | 18500 | 10000 | 8500 | 3530 | 22030 |
| Solids content | wt % | 41.0 | 53.5 | 54.0 | 54.0 | 25.0 | 45.1 |
| Vol flowrate | m³/h | 57.7 | 55.4 | 30.0 | 25.5 | 27.7 | 83.1 |

In this Example, the hydrocyclone increases the solids concentration of the stream to be passed downstream from 41 wt % to 54 wt %. Recycling part of this flow means that the solids concentration of the slurry flow into the hydrocyclone is 45.1 wt % compared with 41.0 wt % leaving the reactor.

Example 2

This Example shows how recycling part of the solids-rich flow from the hydrocyclone can enable a constant solids concentration to be maintained at the input into the hydrocyclone, despite different conditions in the stream exiting the reactor. In this Example, the solid flowrate leaving the reactor is higher than Example 1, but the solids concentration is lower.

TABLE 2

|  |  | Line 9 before recycle | Line 12 | Line 14 | Line 15 | Line 16 | Line 9 after recycle |
|---|---|---|---|---|---|---|---|
| Total slurry flow | kg/h | 37610 | 45710 | 18690 | 27020 | 18910 | 64620 |
| Liquid flow | kg/h | 22940 | 21260 | 8690 | 12560 | 14250 | 35500 |
| Solid flow | kg/h | 14670 | 24450 | 10000 | 14460 | 4660 | 29120 |
| Solids content | wt % | 39.0 | 53.5 | 54.0 | 54.0 | 25.0 | 45.1 |
| Vol flowrate | m$^3$/h | 66.6 | 73.2 | 30.0 | 43.3 | 36.6 | 109.9 |

Example 3 (Comparative)

This Example describes a case where there is no recycle line, ie there is no flow in line 15, and the flow in lines 12 and 14 is therefore the same. This Example should be compared with Example 4, where the flow exiting the reactor is changed.

TABLE 3

|  |  | Line 9 | Line 12 | Line 14 | Line 15 | Line 16 |
|---|---|---|---|---|---|---|
| Total slurry flow | kg/h | 28640 | 20230 | 20230 | 0 | 8420 |
| Liquid flow | kg/h | 16900 | 10230 | 10230 | 0 | 6670 |
| Solid flow | kg/h | 11740 | 10000 | 10000 | 0 | 1750 |
| Solids content | wt % | 41.0 | 49.4 | 49.4 | — | 21.0 |
| Vol flowrate | m$^3$/h | 50.0 | 33.4 | 33.4 | 0 | 16.7 |

Example 4 (Comparative)

Compared with Example 3, in this case the solids content of the output from the reactor is only 39 wt %, which means that the input into the concentrator is also only 39 wt %. This should be compared with Example 2, where a similar change in output concentration from the reactor did not result in a change in the solids concentration entering the hydrocyclone, due to the recycle line. In Examples 1 and 2, not only is the solids concentration of the line entering the hydrocyclone higher than in this Example, but the solids concentration of the solids-rich stream exiting the hydrocyclone is also significantly higher than in Examples 3 and 4.

TABLE 4

|  |  | Line 9 | Line 12 | Line 14 | Line 15 | Line 16 |
|---|---|---|---|---|---|---|
| Total slurry flow | kg/h | 29870 | 21080 | 21080 | 0 | 8790 |
| Liquid flow | kg/h | 18220 | 11080 | 11080 | 0 | 7140 |
| Solid flow | kg/h | 11650 | 10000 | 10000 | 0 | 1650 |
| Solids content | wt % | 39.0 | 47.0 | 47.0 | — | 19.0 |
| Vol flowrate | m$^3$/h | 52.9 | 35.2 | 35.2 | 0 | 17.6 |

The invention claimed is:

1. Olefin polymerisation process which comprises:
producing a slurry of olefin polymer within a polymerisation zone,
withdrawing a polymer slurry stream from the polymerisation zone, and
passing the polymer slurry stream through a transfer line to a centrifugal concentrating device, which separates the polymer slurry stream into a solids-lean stream or streams each having a solids concentration less than that of the polymer slurry stream entering the concentrating device and a solids-rich stream or streams each having a solids concentration greater than that of the polymer slurry stream entering the concentrating device,
wherein 2-60 vol % of the solids-rich stream or streams is recycled back into the polymer slurry stream upstream of the concentrating device and downstream of the polymerisation zone.

2. Process according to claim 1, wherein the flowrate of the solids-rich recycle stream to the polymer slurry stream upstream of the concentrating device constitutes up to 99 vol % of the feed stream to the concentrating device.

3. Process according to claim 1, wherein the proportion of the feed stream to the concentrating device provided by the solids-rich recycle stream is varied such that the feed stream to the concentrating device itself varies by no more than 20% from the average over any one hour period.

4. Process according to claim 1, wherein 10-30 vol % of the solids-rich slurry stream is recycled back into the polymer slurry stream upstream of the concentrating device and downstream of the polymerisation zone.

5. Process according to claim 1, wherein the solids-rich recycle stream has a solids concentration of greater than 65 wt %.

6. Process according to claim 1, wherein the solids-rich recycle stream has a solids concentration of 45-65 wt %.

7. Process according to claim 1, wherein the solids concentration of the solids-rich stream is at least 5 wt % greater than the average solids concentration in the polymerisation reactor.

8. Process according to claim 1, wherein a pump is located in the polymer slurry stream upstream of the concentrating device and downstream of the introduction point of the recycled solids-rich stream.

9. Process according to claim 1, wherein the difference between the average solids concentration in the feed to the concentrator and the average solids concentration within the polymerisation reactor is maintained at 30-70 wt % of the difference between the average solids concentration within the reactor and the average solids concentration in the solids-rich stream withdrawn from the concentrator.

10. Process according to claim 1, wherein at least part of the polymerisation reactor withdrawal stream and/or the solids-rich stream and/or the solids-lean stream withdrawn from the concentrator are provided with cooling.

11. Process according to claim 2, wherein the flowrate of the solids-rich recycle stream to the polymer slurry stream upstream of the concentrating device constitutes between 10 and 80 vol % of the feed stream to the concentrating device.

12. Process according to claim 3, wherein the proportion of the feed stream to the concentrating device provided by the solids-rich recycle stream is varied such that the feed stream to the concentrating device itself varies by no more than 10% from the average over any one hour period.

13. Process according to claim 7, wherein the solids concentration of the solids-rich stream is 10-20 wt % greater than the average solids concentration in the polymerisation reactor.

14. Process according to claim 9, wherein the difference between the average solids concentration in the feed to the concentrator and the average solids concentration within the polymerisation reactor is maintained at 40-60 wt % of the difference between the average solids concentration within the reactor and the average solids concentration in the solids-rich stream withdrawn from the concentrator.

\* \* \* \* \*